US008627411B2

(12) United States Patent
Li et al.

(10) Patent No.: US 8,627,411 B2
(45) Date of Patent: Jan. 7, 2014

(54) TECHNIQUES TO SHARE BINARY CONTENT

(75) Inventors: Naizhi Li, Redmond, WA (US);
Maimoon Nasim, Durham, NC (US);
Matthew A Goldberg, Bellevue, WA (US); Jeroen Vanturennout, Snohomish, WA (US); Ranjib Badh, Sammamish, WA (US); Arimand Samuel, Redmond, WA (US); Satvir Randhawa, Redmond, WA (US); Alex Odle, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 266 days.

(21) Appl. No.: 12/817,943

(22) Filed: Jun. 17, 2010

(65) Prior Publication Data
US 2011/0314516 A1 Dec. 22, 2011

(51) Int. Cl.
G06F 7/04 (2006.01)
G06F 15/16 (2006.01)
G06F 17/30 (2006.01)
H04L 29/06 (2006.01)

(52) U.S. Cl.
USPC .......................................................... 726/3

(58) Field of Classification Search
USPC .......................................................... 726/3
See application file for complete search history.

(56) References Cited

U.S. PATENT DOCUMENTS

| 7,363,378 | B2 | 4/2008 | Holmes |
| 7,539,727 | B2 | 5/2009 | Miller |
| 2008/0120397 | A1 | 5/2008 | Hartman |
| 2008/0133445 | A1 | 6/2008 | Pennington |
| 2008/0208963 | A1 | 8/2008 | Eyal |
| 2008/0320139 | A1 | 12/2008 | Fukuda |
| 2009/0144392 | A1* | 6/2009 | Wang et al. .................. 709/217 |
| 2009/0234876 | A1 | 9/2009 | Schigel |
| 2010/0274859 | A1* | 10/2010 | Bucuk .......................... 709/206 |

OTHER PUBLICATIONS

Pouwelse, J.A., et al. "Tribler: A social-based Peer-to-Peer system", Department of Computer Science, Delft University of Technology, the Netherlands, 6 pages.
"What is eMule?", Retrived from the Internet on Mar. 4, 2010, 1 page. http://www.emule-project.net/home/perl/general.cgi?I=1.

* cited by examiner

Primary Examiner — Kambiz Zand
Assistant Examiner — Stephen Sanders

(57) ABSTRACT

Techniques to share binary content are described. An apparatus may comprise a first related client having a message platform with a file share feature and an object store, the file share feature operative to retrieve a data object for a publishing client having a defined relationship with the first related client and a second related client, the first related client to send the data object to the second related client on behalf of the publishing client, and the object store operative to store and manage the data object using a unique name identifier received with the data object. Other embodiments are described and claimed.

20 Claims, 8 Drawing Sheets

*System 100*

500

RECEIVE A DATA OBJECT FOR A PUBLISHING CLIENT BY A FIRST RELATED CLIENT HAVING A DEFINED RELATIONSHIP WITH THE PUBLISHING CLIENT
502

STORE THE DATA OBJECT OF THE PUBLISHING CLIENT BY THE FIRST RELATED CLIENT
504

RECEIVE A REQUEST FOR THE DATA OBJECT FROM A SECOND RELATED CLIENT HAVING A DEFINED RELATIONSHIP WITH THE PUBLISHING CLIENT
506

SEND THE DATA OBJECT FROM THE FIRST RELATED CLIENT TO THE SECOND RELATED CLIENT
508

*FIG. 5*

TECHNIQUES TO SHARE BINARY CONTENT

BACKGROUND

Communication systems are increasingly used for sharing binary content, such as photographs, videos, files and so forth. As volume and size of shared binary content increases, so does the amount of resources needed by a communication system to deliver the shared binary content to interested parties. Conventional systems typically deliver shared binary content by publishing it using a client-server model. For instance, a user may publish a photograph on a social networking system (SNS) for consumption by other users of the same SNS. However, this creates increasing load amounts on a central server as users attempt to access the shared binary content, which increases server costs. Alternatively, conventional systems allow peer-to-peer transfers between computing devices for file sharing. However, this requires that a computing device storing the shared binary content is online and available for file transfers, which reduces availability. As such, a substantial need exists for enhanced techniques for sharing binary content in a communication system. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to share binary content in a communication system. Some embodiments are particularly directed to enhanced techniques to distribute and share binary content between computing devices over a communication system based on defined relationships between users of the computing devices. Defined relationships may include relationships between members of a web service, such as a Social Networking System (SNS), Instant Messaging network, group membership or online software platforms, and so forth. The concept of defined relationships may be used to facilitate distribution and sharing of binary content among the members Various embodiments are generally directed to techniques to share binary content. Some embodiments are particularly directed to techniques to share binary content between computing devices based on defined relationships between users of the computing devices. In one embodiment, for example, an apparatus may comprise a first related client having a message platform with a file share feature and an object store, the file share feature operative to retrieve a data object for a publishing client having a defined relationship with the first related client and a second related client, the first related client to send the data object to the second related client on behalf of the publishing client, and the object store operative to store and manage the data object using a unique name identifier received with the data object. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5 illustrates an embodiment of a first logic flow for a first relation.

DETAILED DESCRIPTION

Figure 1:
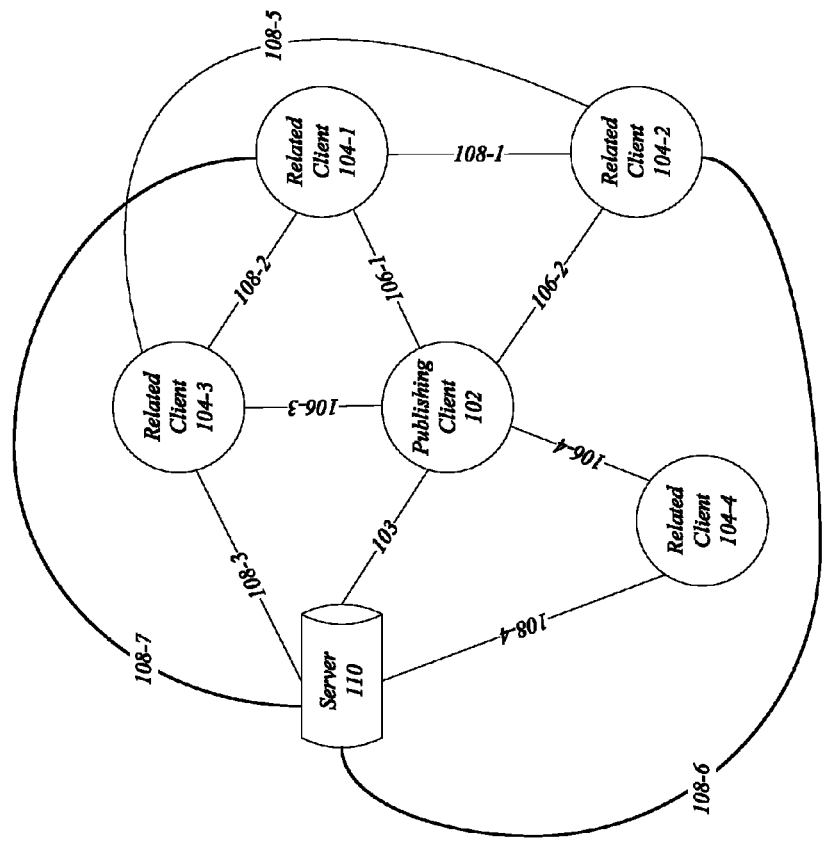
FIG. 1 illustrates an embodiment of a first system to share binary content.

Various embodiments are generally directed to techniques to share binary content in a communication system. Some embodiments are particularly directed to enhanced techniques to distribute and share binary content between computing devices over a communication system based on defined relationships between users of the computing devices. As a result, the embodiments can improve affordability, scalability, modularity, extendibility, or interoperability for an operator, device or network.

Shared binary content may refer to any discrete set of data such as a computer file having any type of data encoded in binary form for computer storage and processing purposes. Examples of shared binary content may include various types of data objects. A data object refers to any type of data stored in object form. In various embodiments, data in an object may comprise any Binary Large Objects (BLOB) of data of any size or type. Examples of data objects may include without limitation an object comprising any type of data including text, audio, sounds, video, audio/video (A/V), images, graphics, photographs, animation, application data, multimedia data, metadata, programs, application programs, system programs, compressed data, and any other data consistent with the embodiments. The embodiments are not limited in this context.

Various embodiments may utilize defined relationships between members of a web service, such as a Social Networking System (SNS), Instant Messaging network, group membership or online software platforms, to facilitate distribution and sharing of binary content among the members. In many cases, SNS members have a defined relationship with each other giving permission to access binary content published by the SNS members. Such SNS members are sometimes referred to as "friends" or "buddies," for example. Sharing of binary content in a SNS typically possesses a fan out structure, whereby a publishing client (e.g., a computing device) used by a publishing SNS member shares binary content with multiple related clients (e.g., computing devices) used by friends of the publishing SNS member. In some cases, however, all friends may not be online when a publishing client initially publishes shared binary content. Online may refer to a real-time connection to a SNS over a network and available for person-to-person communications. To gain access to shared binary content, a related client may attempt to access SNS servers to access the shared binary content. However, this client-server model may increase load amounts on SNS servers based on a number of related clients attempting to access the shared binary content. Alternatively, a related client may initiate a peer-to-peer transfer of the shared binary content directly from the publishing client. However, this also increases load amounts for a publishing client. Furthermore a publishing client may be offline and therefore unavailable for peer-to-peer file transfers. As such, there may be challenges to distributing shared binary content using conventional distribution and sharing models.

To solve these and other problems, various embodiments implement enhanced techniques for sharing binary content in a communication system by leveraging defined relationships between related entities. Rather than accessing online servers for shared binary content, a related client (or friend) of a publishing client may request and retrieve the shared binary content from another related client (or friend) of the publishing client that already has the shared binary content. As soon as a related client retrieves and stores shared binary content to memory, all related clients (or friends) of the publishing client now have multiple sources for the shared binary content, namely the publishing client and any related clients storing the shared binary content. Progressively, shared binary content from a publishing client is replicated on related clients in a SNS, thereby diminishing dependence on the publishing client and SNS servers. This sharing and distribution technique potentially reduces load on central servers, and in some cases the publishing client, both of which may need to be accessed only when there are no other online friends having the shared binary content. Shared binary content may be accessed using either a "push" model where one related client sends the shared binary content to another related client, or a "pull" model where one related client retrieves the shared binary content from another related client. The embodiments are not limited in this context.

In various embodiments, it may be appreciated that the term "publishing client" and "related client" as used herein may refer to any electronic device, such as a computing device, used by an individual (a user) that has a defined relationship with one or more other individuals (other users). In this context, the terms "publishing client" and "related client" may not necessarily mean that the actual devices have some relationship with each other, or that an individual has a relationship with a specific device, although that may be the case in some embodiments. In one embodiment, for example, "related clients" may comprise or be implemented as edge caches on a device serving other devices. In one embodiment, the terms "publishing client" and "related client" refer to relationships between human beings as interpreted and implemented through various electronic devices. The terms "publishing client" and "related client" is not meant to be limited to a particular type of relationship or a particular device.

In one embodiment, for example, an apparatus may comprise a first related client having a message platform with a file share feature and an object store. The file share feature may be operative to retrieve a data object for a publishing client having a defined relationship with the first related client and a second related client, and send or provide the data object to the second related client on behalf of the publishing client. The object store may be operative to store and manage the data object using a unique name identifier received with the data object.

The various clients, publishing client and related clients, may have a defined relationship between each other. The defined relationship may be any form of relationship giving a certain level of permission to access shared binary content of a publishing client or a related client. In some cases, for example, the defined relationship may comprise a dyadic relationship. A dyadic relationship may refer to members of a group having an ongoing relationship or interaction. An example of a dyadic relationship may be friends in a SNS. In one embodiment, the members of a group may include a publishing client and two or more related clients each having a defined relationship with the publishing client. For instance, a first friend may have defined relationships with each of a second friend and a third friend, although the second and third friends may or may not have a defined relationship with each other. In one embodiment, the members of a group may include a publishing client and two or more related clients each having a defined relationship with the publishing client and each other. For instance, a first friend may have defined relationships with each of a second friend and a third friend, and the second and third friends may also have a defined relationship with each other. In this case, the first, second and third friends may be referred to as "mutual friends" as they form a triangular relationship among each other. The concept of "mutual friends" may automatically apply to members within a specifically defined relationship group, such as a message group, an IM group, a security group, a business group, or any other aggregated pool of users. In another example, a first friend may have defined relationships with each of a fourth friend and a fifth friend, and the fourth friend and the fifth friend may not have a defined relationship with each other. In this case, the fourth and fifth friends have a second degree relationship with each other through the first friend. It may be appreciated that a dyadic relationship may include more than three clients or friends as desired for a given implementation. The embodiments are not limited in this context.

FIG. 1 illustrates a block diagram for a system 100 to share binary content among computing devices used by members of a group having a defined relationship. In one embodiment, for example, the system 100 may comprise a computer-implemented system 100 having multiple devices or components. As used herein the terms "system" and "device" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. An example of a computer-implemented system may be described in more detail with reference to FIG. 7. The embodiments are not limited in this context.

Various elements of the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In the illustrated embodiment shown in FIG. 1, the system 100 comprises or implements a web service such as a social network system (SNS) allowing users to befriend other online users and share binary content such as comments, messages, files, and so forth. As shown, the system 100 comprises a publishing client 102, multiple related clients 104-1-a, and a server 110. The publishing client 102 is communicatively coupled to the server 110 by a communication link 103. The publishing client 102 is communicatively coupled to the related clients 104-1-a by communication links 106-1-b. The related clients 104-1-a are each communicatively coupled to each other by communication links 108-1-c. The communication links 103, 106-1-b, and 108-1-c may be wired or wireless communication links using any conventional communication technologies. It is worthy to note that "a" and "b" and "c" and similar designators are variables representing any positive integer.

The clients 102, 104-1-a may comprise or be implemented as computing devices executing application programs on behalf of SNS members to interact with a SNS implemented by the server 110. In one embodiment, the application programs may comprise locally-executing software applications specifically designed for communicating with the server 110. In one embodiment, the application program may comprise a general web browser capable of accessing the server 110 over a network, such as the Internet. In both cases, the clients 102, 104-1-a may form a connection with the server 110 over the communication links 103, 106-1-b, and/or 108-1-c to access applications, services and features offered by the SNS implemented by the server 110, including shared binary content. The connections may be direct connections between the application programs and the server 110, or indirect connections via other applications, such as one or more messaging applications (e.g., email, instant messaging, chat, short message service, multimedia message service, and so forth)), or media-relay connections (e.g., a traversal using relay network address translators (TURN) connection). Furthermore, the clients 102, 104-1-a may form a connection with each other over the communication links 106-1-b, 108-1-c to access binary content stored by the clients 102, 104-1-a. In some cases, the connections may be direct connections using peer-to-peer techniques, or indirect connections through another application, service or device, such as the SNS implemented by the server 110, one or more messaging applications (e.g., email, instant messaging, chat, short message service, multimedia message service, and so forth), and other communication modalities consistent with the described embodiments. In some cases, peer-to-peer techniques may include communicating directly (e.g., using TCP) or indirectly relayed through another network device.

The server 110 may implement a web service such as a SNS. Examples of SNS may include without limitation MICROSOFT® WINDOWS LIVE®, MYSPACE™, FACEBOOK™, LINKEDIN™, TWITTER™, BEBO™, and other social networking services consistent with the described embodiments. Additionally or alternatively, the server 110 may comprise a network storage server for storing and distributing shared binary content. The embodiments are not limited in this context.

In one embodiment, the server 110 may comprise a centralized internet host used for storage and other services of metadata for SNS members, such as distribution lists, security information, authentication information, friend information, profile information, subscriber information, personal information, and so forth. Each SNS member may subscribe to the SNS and publish various types of binary content, such as audio, video, pictures and/or other documents. In some cases, a SNS member may publish the binary content so it may be shared among other SNS members having a defined or dyadic relationship with the publishing client 102, such as SNS members who have accepted a friendship relationship with the publishing client 102, such as related clients 104-1-a (also referred to as "friends" or "buddies.") In some cases, the publishing client 102 and two or more clients 140-1-a may comprise mutual friends or buddies.

The SNS implemented by the server 110 may publish, distribute or share binary content for consumption by various SNS members. In various embodiments, pointers to stored binary content are unique. Examples may include without limitation hashes to the actual file content. This enables unique identification of stored binary content across a network or system. The shared binary content may be stored by the server 110 and a publishing client 102. Consistent with the described embodiments, the shared binary content may also be stored and distributed by one or more related clients 104-1-a, when the one or more related clients 104-1-a have a defined relationship with the publishing client. In various embodiments, the defined relationship may be a dyadic relationship, although other types of relationships are possible as consistent with the described embodiments.

Referring again to a social network depicted by system 100 of FIG. 1, a publishing client 102 shares binary content with a group of related clients 104-1-a having a defined relationship with the publishing client 102 (e.g., where the SNS members are friends). Assume the publishing client 102 has a defined relationship with the related clients 104-1, 104-2, 104-3 and 104-4. Further assume that the related clients 104-1, 104-2 and 104-3 have a defined relationship with each other. In addition, assume related client 104-4 does not have a defined relationship with the related clients 104-1, 104-2 and 104-3. Each of the publishing client 102 and the related clients 104-1 to 104-4 are connected to the server 110 via respective connections 108-6, 108-7.

This group of friends will be seeded with shared binary content as soon as a first friend obtains the stored binary content from the publishing client 102. For instance, assume the publishing client 102 shares binary content with the related clients 104-1 to 104-4. While doing so, the publishing client 102 uploads the shared binary content to the server 110 using the communication link 103. The related client 104-1 happens to be online at this moment and retrieves the shared binary content from the publishing client 102 via the communication link 106-1. The related clients 104-2, 104-3 and 104-4 are not online at this time. Assume the publishing client 102 goes offline, while the related client 104-1 stays online.

In various embodiments, the shared binary content may only be retrieved from mutual friends of both the publishing client 102 and related clients. Limiting retrieval to mutual friends ensures a higher level of security and privacy, since mutual friends have a known defined relationship, and therefore downloading the shared binary content of the publishing client 102 as stored by a mutual friend reduces risk of unauthorized access by unknown clients. However, this arrangement may have a disadvantage of limiting a potential pool of available friends to retrieve shared binary content of the publishing client 102. For example, assume the related client 104-3 comes online after the related client 104-1 has stored the shared binary content of the publishing client 102. Although the related client 104-3 has the capability to download the shared binary content from the server 110 via the communication link 108-3, the related client 104-3 may be arranged to attempt retrieval of the shared binary content from online mutual friends of the publishing client 102. Instead of going to the server 110 for the shared binary content, the related client 104-3 attempts to retrieve the shared binary content of the publishing client 102 stored by the related client 104-1 over the communication link 108-2. The related clients 104-1, 104-3 have a defined relationship to each other as well as the publishing client 102. As friends of both the publishing client 102 and the related client 104-1, the related client 104-3 is considered a mutual friend of the publishing client 102 and the related client 104-1. Similarly, when the related client 104-2 comes online, the related client 104-2 may attempt to retrieve the shared binary content from the related client 104-1 over the communication link 108-1 if the related client 104-1 is online. If the related client 104-1 is not online, the related client 104-2 may attempt to retrieve the shared binary content from the related client 104-3 over the communication link 108-5. The related clients 104-2, 104-3 have a defined relationship with each other as well as the publishing client 102. As friends of both the publishing client 102 and the related client 104-2, the related client 104-3 is considered a mutual friend of the publishing client 102 and the related client 104-2.

In various embodiments, the shared binary content may be retrieved from any friends of the publishing client 102 either when related clients themselves are directly related to each other (e.g., mutual friends) or have a second degree relationship through the publishing client 102 (e.g., second degree friends). This arrangement may provide a lower level of security and privacy, since there is no defined relationship between related clients attempting to access the shared binary content. However, there is an implicit relationship that may be inferred by a related client storing the shared binary content based on the defined relationship between the publishing client 102 and the related client attempting to download the shared binary content, which may be suitable for some use scenarios. This arrangement provides an advantage of increasing a potential pool of available friends to retrieve shared binary content of the publishing client 102, and in some cases may match an entire friend list of the publishing client 102. For instance, when the related client 104-4 comes online, and the publishing client 102 is offline, the related client 104-4 may attempt to retrieve the shared binary content of the publishing client 102 from any of the related clients 104-1, 104-2 or 104-3, even though the related client 104-4 does not have a defined relationship with any of the related clients 104-1, 104-2 or 104-3. In cases where a mutual friend parameter is enabled, or when none of the related clients 104-1, 104-2 or 104-3 are online, the related client 104-4 may attempt to retrieve the shared binary content from the server 110 over the communication link 108-4.

In various embodiments, the publishing client 102 and/or the related clients 104-1-*a* may implement various distribution rules to further enhance sharing and distribution techniques implemented by the system 100. The distribution rules may control sharing and distribution techniques based on any number of design or performance criteria, including available processing resources for the publishing client 102 and/or the related clients 104-1-*a*, communications resources for the communication links 103, 106-1-*b*, and/or 108-1-*c*, communication parameters, security policies, presence information (e.g., online, offline, available, etc.), power parameters, cost parameters, and so forth. For instance, a distribution rule may instruct related clients 104-1-*a* to attempt retrieval of shared binary content in a certain order, such as beginning with accessing online friends, then the publishing client 102, and finally the server 110. A distribution rule may instruct the publishing client 102 and/or the related clients 104-1-*a* to use a particular type of communication technique when communicating the shared binary content, such as currently established peer-to-peer connections, for example. A distribution rule may instruct the related clients 104-1-*a* to check a distribution list indicating which of the related clients 104-1-*a* have already stored the shared binary content, and a presence indicator indicating which of the related clients 104-1-*a* on the distribution list are online, and attempt to retrieve the shared binary content from the online related clients 104-1-*a* storing the shared binary content. A distribution rule may instruct the related clients 104-1-*a* to check for mutual friends to download the shared binary content. A distribution rule may instruct the related clients 104-1-*a* to check for any friends of the publishing client 102 to download the shared binary content. A distribution rule may instruct the related clients 104-1-*a* to rank order retrieval of the shared binary content based on bandwidth parameters of the communication links 106-1-*b*, 108-1-*c*. A distribution rule may instruct the related clients 104-1-*a* to rank order retrieval of the shared binary content based on cost parameters (e.g., number of hops, cost per link) of the communication links 106-1-*b*, 108-1-*c*. A distribution rule may instruct the related clients 104-1-*a* to rank order retrieval of the shared binary content based on latency parameters of the communication links 106-1-*b*, 108-1-*c*. A distribution rule may instruct the related clients 104-1-*a* to rank order retrieval of the shared binary content based on previous download success parameters of the communication links 106-1-*b*, 108-1-*c*. A distribution rule may instruct the related clients 104-1-*a* to rank order retrieval of the shared binary content based on other types of shared binary content stored by, and accessible from, the clients 104-1-*a*. A distribution rule may instruct the related clients 104-1-*a* to rank order retrieval of the shared binary content based on shared resources, such as a common communications network, transports, protocols, device configuration, Internet Service Provider, and other device or network resources. It may be appreciated that these are merely some examples of distribution rules, and other distribution rules consistent with the described embodiments may also be defined as desired for a given implementation. The embodiments are not limited in this context.

In various embodiments, the publishing client 102, the related clients 104-1-*a*, and/or the server 110 may implement a passive distribution system or an active distribution system. A passive distribution system is where shared binary content is requested by the various related clients 104-1-*a*. An active distribution is where shared binary content is pushed to the various related clients 104-1-*a*. Various embodiments are described in the context of a passive distribution system. However, other embodiments may implement an active distribution system using similar principles as those described herein.

Figure 2:
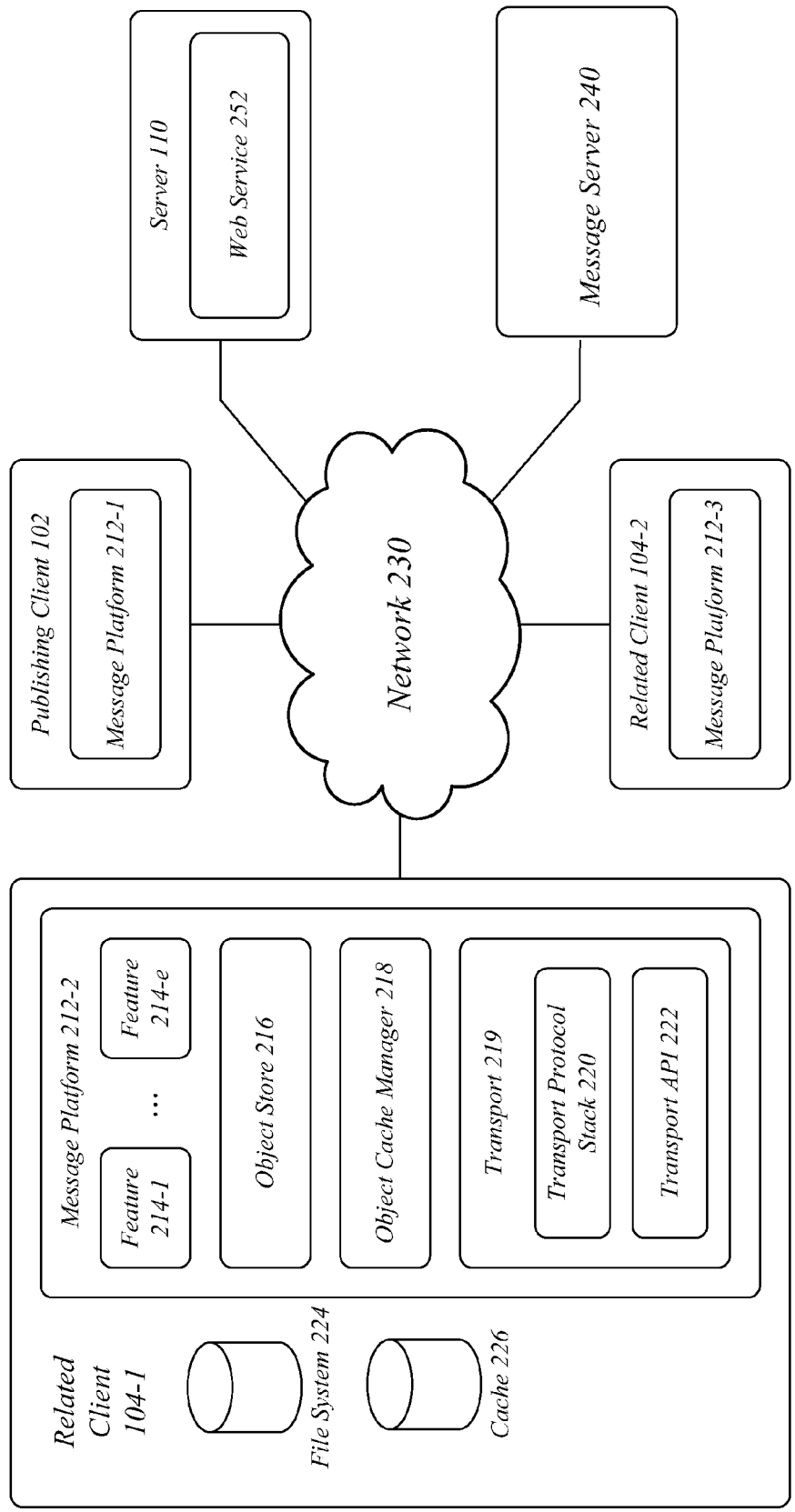
FIG. 2 illustrates an embodiment of a second system to share binary content.

FIG. 2 illustrates a block diagram of a system 200 to share binary content among computing devices used by members of a group having a defined relationship. The system 200 may be similar to the system 100, and may provide a more detailed block diagram for the publishing client 102 and the related clients 104-1-a. The system 200 may also provide a more detailed block diagram for the server 110, and add a message server 240 for those embodiments using a message application and message connection for communicating shared binary content among friends in a SNS. All of these elements may communicate over a network 230 using techniques described in more detail with reference to FIG. 8.

In various embodiments, the publishing client 102, the related client 104-1 and the related client 104-2 may each implement a respective message platform 212-1-d, such as message platforms 212-1, 212-2 and 212-3. Although the publishing client and related clients 104-1, 104-2 are described using a message platform 212-1-d to communicate data objects and/or related metadata, it may be appreciated that any communication technique may be implemented by the publishing client 102 and the related clients 104-1, 104-2 to communicate data objects, including without limitation stand-alone application programs designed to interoperate with the web service 252 of the server 110, application programs such as those provided by MICROSOFT OFFICE, an operating system, and so forth. The embodiments are not limited in this context.

As previously described, the server 110 may comprise or employ one or more server computing devices and/or server programs that operate to perform various methodologies in accordance with the described embodiments. For example, when installed and/or deployed, a server program may support one or more server roles of the server computing device for providing certain services and features. Examples for the server 110 may include without limitation stand-alone and enterprise-class server computers operating a server OS such as a MICROSOFT OS, a UNIX® OS, a LINUX® OS, or other suitable server-based OS.

The web service 252 may comprise any server program capable of storing shared binary content such as data objects, and distributing the shared binary content to a group of members having defined relationships indicating a level of permission to access the shared binary content by the members. In one embodiment, the web service 252 may comprise or implement a SNS. Examples of SNS may include without limitation MICROSOFT WINDOWS LIVE, MYSPACE, FACEBOOK, LINKEDIN, TWITTER, BEBO, and any other social networking services consistent with the described embodiments. In one embodiment, the web service 252 may comprise or implement online storage of documents and files, such as MICROSOFT WINDOWS LIVE. Other examples for the web service 252 may include without limitation server programs such as business application programs, search applications, document management programs, weblogs (blogs), word processing programs, spreadsheet programs, database programs, drawing programs, document sharing programs, message applications, web services, web applications, web services, web feeds such as really simple syndication (RSS), and/or other types of programs, applications, or services for storing and distributing shared binary content in accordance with the described embodiments.

As with the server 110, the message server 240 may also comprise or employ one or more server computing devices and/or server programs that operate to perform various methodologies in accordance with the described embodiments. For example, when installed and/or deployed, a server program may support one or more server roles of the server computing device for providing certain services and features. Exemplary message server 240 may include, for example, stand-alone and enterprise-class server computers operating a server OS such as a MICROSOFT OS, a UNIX OS, a LINUX OS, or other suitable server-based OS. In addition, the message server 240 may implement server programs providing communications or messaging services. Exemplary server programs may include, for example, communications server programs such as MICROSOFT OFFICE COMMUNICATIONS SERVER (OCS) or MICROSOFT WINDOWS LIVE servers for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

The related client 104-1 may comprise various storage media arranged to store shared binary content. As shown, the related client 104-1 may implement a file system 224 and a cache 226. The file system 224 and the cache 226 may comprise storage media arranged to store various types of data objects as managed by the object store 216 and/or the object cache manager 218. In various embodiments, the file system 224 and/or the cache 226 may store a data object using a unique name identifier, such as a globally unique identifier (GUID), thereby allowing the data object to be retrieved from any of the devices of the system 200.

In one embodiment, the unique name identifier may be generated using hashes to the actual data or metadata of a data object. This may facilitate fast and unique identification across the system 200. For example, object metadata that describes a data object may be stored with the data object. The exemplary object metadata may include a name field, a type field, a friendlyname field, a hash1 field, a hash2 field, a creator field, and other information (e.g., a URL). The name is a string that identifies the object. In one embodiment, the name field is a combination of one or more of the metadata fields. The type field specifies a type for a data object. The friendlyname field is a user-readable name that a user can give a data object. The creator field is an identifier for a creator of a data object, such as the publishing client 102.

In one embodiment, the hash1 field has a value uniquely associated with the data object, and may be used to locate the data object in the cache 226 (or file system 224). The hash1 value is generated using a cryptographic hashing function, such as a Secure Hash Algorithm 1 (SHA1). The SHA1 function takes the data object as input to generate the hash1 value. An example calling signature of the SHA1 function is SHA1 (Data) where Data refers to the data object to be stored. SHA1 is an algorithm for computing a "condensed representation" of the data object. The "condensed representation" is typically of fixed length and is known as a "message digest" or "fingerprint." A common fixed length of the hash1 field is 160 or 256 bits, which virtually guarantees that the hash1 value will be unique for every object. The uniqueness of the hash1 value enables the hash1 value to act as a "fingerprint" of the data object, to ensure data integrity and allow for data comparison checking. For instance, when data object is downloaded, the hash1 value can be calculated and compared to a previous hash1 value to guarantee that the data object is unaltered. The hash1 value can also be used as an index into the cache 226 to locate the previously stored data object.

The hash1 value may be calculated using other known algorithms, such as the Message Digest Algorithm 5 (MD5) developed by Professor Ronald L. Rivest. Using MD5, SHA1, or a similar algorithm, the hash1 value is non-reversible, meaning that the data object cannot be generated from the hash1 value. The hash2 field is a hash value that results when the metadata fields (e.g., the creator field, the type field, the friendlyname field, the location field, and the hash1 field) are input into a hash function, such as the SHA1 function discussed above. The hash1 value, the hash2 value and/or other information may be used as a unique name identifier for a data object stored by the system 200.

The related client 104-1 may comprise the message platform 212-2. The message platform 212 may comprise a representative example for the message platforms 212-1-*d*. It may be appreciated that the message platforms 212-1, 212-3 may implement the same or similar elements as those shown for the message platform 212-2. The message platform 212-2 may comprise or implement any message application, service or features to communicate messages and/or data objects to other message platforms 212-1-*d*. In one embodiment, the messages and/or data objects may be routed through the message server 240. In one embodiment, the messages and/or data objects may be routed directly between message platforms 212-1-*d* without using the message server 240. This may be accomplished using, for example, peer-to-peer communications techniques. Examples for the message platform 212-2 may include without limitation email, instant messaging (IM), chat, short message service (SMS), multimedia message service (MMS), and so forth. In one embodiment, for example, the message platform 212-2 may comprise an IM client such as MICROSOFT WINDOWS LIVE or MICROSOFT OFFICE COMMUNICATOR designed for use with MICROSOFT EXCHANGE SERVER implemented by the message server 240. However, the embodiments are not limited to this example.

The message platform 212-2 may comprise one or more features 214-1-*e*. The features 214-1-*e* may comprise various end user features (EUF) providing certain functionality for a user. The features 214-1-*e* are functions or applications hosted or executed by or within the message platform 212-2 to present data associated with the feature 214-1-*e*. A feature 214-1-*e* may be characterized by the type of data the feature 214-1-*e* presents, the manner of presenting the data, the operations that the feature 214-1-*e* may perform on the data, and/or the interactive options that the feature 214-1-*e* provides to the user to interact with the data. For example, a custom user tile feature 214-1 presents picture data in a screen tile on the user interface. In another example, a file transfer feature 214-2 enables a user to select a file and send the file to another message platform 212-1-*d*. In yet another example, a file share feature 214-3 allows a data object to be published and accessible to another message platform 212-1-*d* for retrieval by the message platform 212-1-*d*. In still another example, a presence feature 214-4 allows presence information for the various devices of the system 200 to be published or consumed by the message platform 212-2. Other features 214-1-*e* are possible and may be customized for a given implementation.

The message platform 212-2 may comprise an object store 216. The object store 216 generally manages objects on behalf of the message platform 212-2 and/or the related client 104-1. The object store 216 provides methods and data for storing, accessing, and otherwise managing data objects communicated by the message platform 212-2. For example, the object store 216 may be used by a file share feature 214-3 to publish and make accessible a data object stored by the file system 224 and/or the cache 226 to the message platform 212-3 implemented by the related client 104-2. The object store 216 handles requests for objects, by determining where the requested objects are and retrieving them from the determined locations. Thus, the object store 216 ca determine whether objects are on a local device, such as in the file system 224 or the cache 226 of the related client 104-1, or a remote device, such as in the web service 252, the publishing client 102, another related client 104-1-*a* such as the related client 104-2, network storage for the network 230, or other network storage location. As discussed in further detail below, the object store 216 can provide degrees of data security by encrypting data, such as by hashing identifier data associated with an object.

The message platform 212-2 may comprise an object cache manager 218. The object cache manager 218 manages objects in the cache 226. In one embodiment, the object cache manager 218 manages the cache 226 implemented as a web browser cache such as the WINDOWS INTERNET EXPLORER® cache, which is the cache used by the WINDOWS INTERNET EXPLORER made by MICROSOFT, Redmond, Wash. In this implementation, when an object is retrieved from a web address (e.g., a uniform resource locator (URL)), the object cache manager 218 will automatically write the object into the cache 226. If an object is retrieved from a location other than a URL location, the object cache manager 218 will request that the transport protocol stack 220 retrieve the object, and the object cache manager 218 writes the object to the cache 226.

The message platform 212-2 may comprise one or more transports 219. The transport 219 may generally communicate data objects between devices, such as the publishing client 102 and the related client 104-1, and the related client 104-1 and the related client 104-2, for example. The transports 219 may comprise a transport protocol stack 220 and a transport application program interface (API) 222. The transport protocol stack 120 and the transport API 122 implement a transport system for the related client 104-1 to communicate with other devices such as the publishing client 102 and the related client 104-2 over the network 230 and/or over a direct connection in a peer-to-peer fashion. The transport protocol stack 220 establishes necessary connections for communicating message data, including data related to the features 214-1-*e* and the object store 216.

In general operation, the related client 104-1 may use the message platform 212-2 with the file share feature 214-3 and the object store 216 to share a data object for the publishing client 102 with the related client 104-2. The file share feature 214-3 may be arranged to retrieve a data object for the publishing client 102 having a defined relationship with the related client 104-1 and the related client 104-2. The related client 104-1 may send the data object to the related client 104-2 on behalf of the publishing client 102. The object store 216 may be arranged to store and manage the data object of the publishing client 102 using a unique name identifier received with the data object. This may be described in more detail with reference to FIG. 3.

Figure 3:
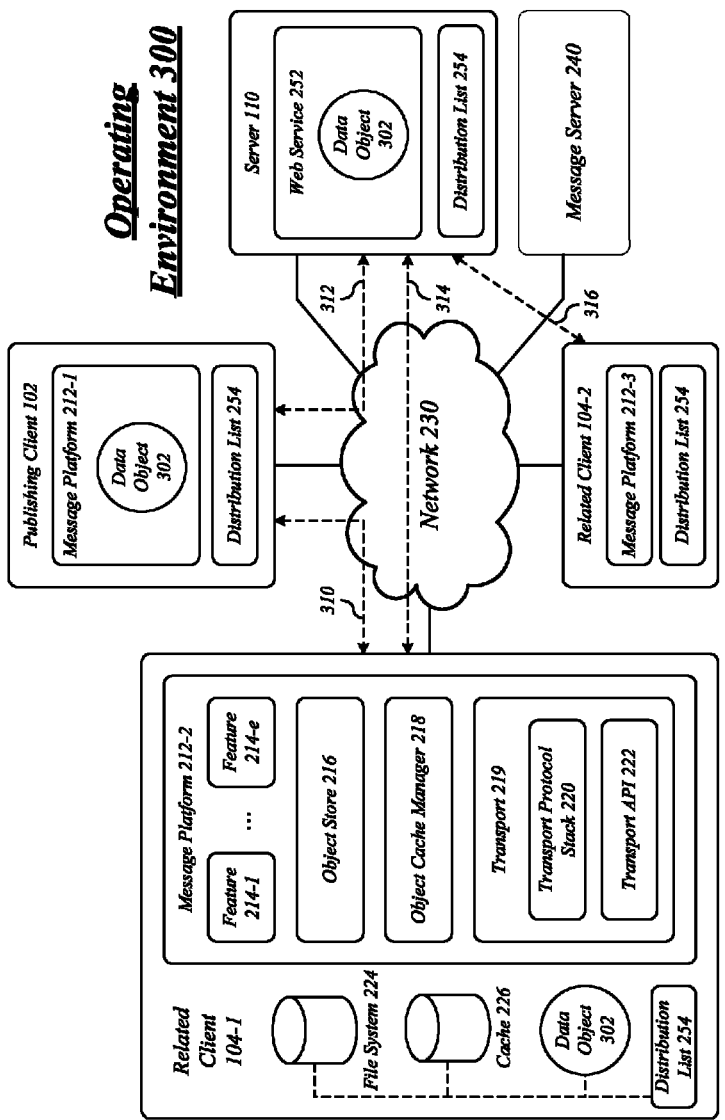
FIG. 3 illustrates an embodiment of a first operating environment.

FIG. 3 illustrates an embodiment of an operating environment 300 suitable for the systems 100, 200. The operating environment 300 illustrates signaling between the various devices of the systems 100, 200 to provide enhanced distribution and sharing services for the publishing client 102 and the related clients 104-1-*a*.

In the illustrated embodiment shown in FIG. 3, the related client 104-1 may use the message platform 212-2 with the file share feature 214-3 and the object store 216 to share a data object 302 for the publishing client 102 with the related client 104-2. As shown, the publishing client 102 may publish shared binary content such as the data object 302 for consumption by a group of friends of a SNS implemented by the web service 252, the group of friends including the related clients 104-1, 104-2. For instance, assume the publishing client 102 updates a user tile with a new profile image for the user as the data object 302. When the publishing client 102 is online it publishes the data object 302 for sharing with the related clients 104-1, 104-2, and notifies the related clients 104-1, 104-2 of the published data object 302 over connections 310, 312. This may be accomplished using the presence feature 214-4. The notification may include, for example, a unique name identifier for the data object 302 and location information for the data object 302 (e.g., a uniform resource locator (URL)). The publishing client 102 may then upload the data object 302 into the web service 252 provided by the server 110 over connection 312. In some cases, uploading the data object 302 operates as the actual publishing operation, such as when the 104-1, 104-2 are automatically notified of any published binary content provided by the publishing client 102 through an automatic feed or notification system.

Upon notification, the file share feature 214-3 of the message platform 212-2 may be arranged to retrieve the data object 302 for the publishing client 102 using the unique name identifier and location information. The file share feature 214-3 may first check a local cache (e.g., the cache 226) to determine whether it already has the data object 302. If there is a cache miss, the file share feature 214-3 of the message platform 212-2 may attempt to retrieve the data object 302 from the publishing client 102 or the web service 252.

The publishing client 102 has a defined relationship with the related client 104-1 and the related client 104-2. Since the publishing client 102 and the related client 104-1 are friends, the related client 104-1 may have necessary permissions to access the data object 302 stored by the publishing client 102 and/or the web service 252. As such, the related client 104-1 may use the presence feature 214-4 to determine whether the publishing client 102 is online, and if so, request the data object 302 from the publishing client 102 using the unique name identifier and location information over connection 310, or the web service 252 over connection 314. The object store 216 may store the retrieved data object 302 in the file system 224 and/or the cache 226 of the related client 104-1. In one embodiment, the object store 216 may be arranged to store and manage the data object 302 of the publishing client 102 using a unique name identifier assigned by the publishing client 102 and/or the web service 252.

Once retrieval of the data object 302 is successful, the file share feature 214-3 may then notify the publishing client 102 and/or the web service 252 that the related client 104-1 is currently storing the data object 302 originally published by the publishing client 102 over respective connections 310, 314. The notification may include a unique name identifier for the data object 302 and location information, such as a URL or an identifier for the related client 104-1, for example. The web service 252 may then update a distribution list 254, and notify the related client 104-2 of the updated distribution list 254 over connection 316. The distribution list 254 may comprise a list of related clients 104-1-a actually storing the data object 302 on behalf of the publishing client 102, or potentially storing the data object 302 on behalf of the publishing client 102. Additionally or alternatively, the distribution list 254 may also comprise distribution criteria and/or distribution rules indicating access levels of the data object 302 published by the publishing client 102. Examples of access levels may include public, network, limited and private. The example of public access is access by any authenticated or unauthenticated user. The example of network access is access by any authenticated user that has a defined relationship with the publishing client 102 (e.g., a friend). The example of limited access is access by a specified subset of authenticated users. The example of private access is access by the publishing client 102 alone. The distribution list 254 may be implemented as part of another list, such as an access control list, for example. The distribution list 254 may be maintained by the publishing client 102, the related client 104-1 or the web service 252, and either may update the distribution list 254 and notify other related clients accordingly.

Figure 4:
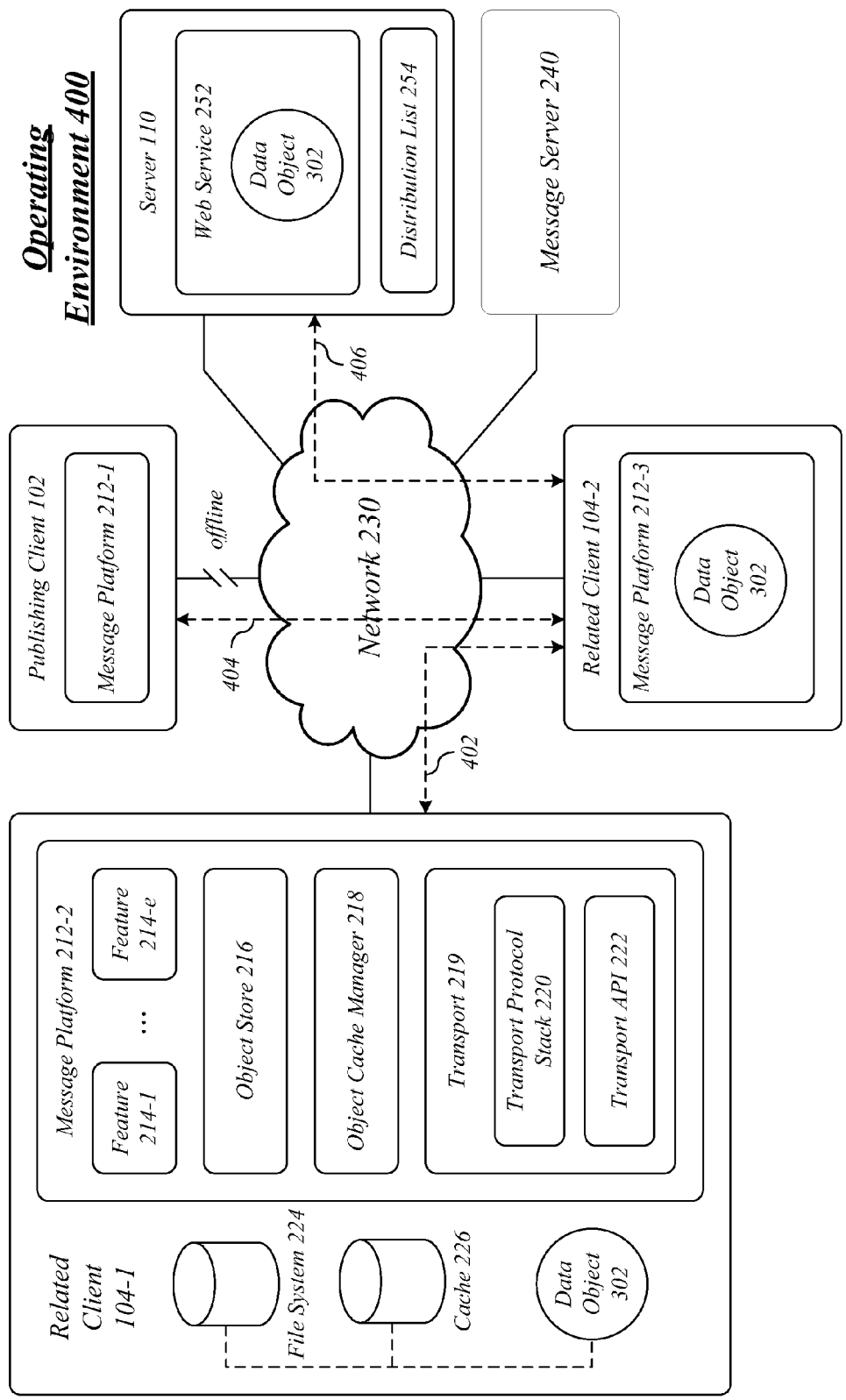
FIG. 4 illustrates an embodiment of a second operating environment.

FIG. 4 illustrates an embodiment of an operating environment 400 suitable for the systems 100, 200. The operating environment 400 illustrates signaling between the various devices of the systems 100, 200 to provide enhanced distribution and sharing services for the publishing client 102 and the related clients 104-1-a.

Since the publishing client 102 and the related client 104-2 are friends, the related client 104-2 may also have necessary permissions to access the data object 302 stored by the publishing client 102 and/or the web service 252. However, rather than increase load on the publishing client 102 or the server 110, or when the publishing client 102 or the server 110 are inaccessible (e.g., offline), the related client 104-2 may attempt to retrieve the data object 302 published by the publishing client 102 as stored by the related client 104-1. The former case may be managed in accordance with one or more distribution rules implemented by the file share feature 214-3 of the message platform 212-3 implemented by the related client 104-2, for example.

The file share feature 214-3 of the message platform 212-3 implemented by the related client 104-2 may receive a unique object name for the data object 302 of the publishing client 102 as stored by the related client 104-1 from the web service 252 over connection 406. Additionally or alternatively, the unique object name may be received from the related client 104-1 or the publishing client 102 over respective connections 402, 404.

The file share feature 214-3 of the message platform 212-3 may check a local cache for the data object 302. If there is a cache miss, the file share feature 214-3 of the message platform 212-3 may attempt to retrieve the data object 302 from the related client 104-1. The file share feature 214-3 of the message platform 212-3 may receive all or a portion of the distribution list 254 indicating that the data object 302 is stored by the related client 104-1. The file share feature 214-3 of the message platform 212-3 may select the related client 104-1 from the distribution list 254 in accordance with one or more distribution rules. The file share feature 214-3 of the message platform 212-3 may also select the related client 104-1 from the distribution list 254 based on presence information for the related client 104-1 as provided by the presence feature 214-4 of the message platform 212-3. Once selected, the file share feature 214-3 of the message platform 212-3 may send a request to retrieve the data object 302 associated with the unique object name to the related client 104-1 over connection 402.

The file share feature 214-3 of the message platform 212-2 implemented by the related client 104-1 may receive the data object request, and issue a control directive to the object store 216 to retrieve the data object 302 from the file system 224 or the cache 226. The object store 216 may search the file system 224 for the data object 302 using the unique name identifier for the data object 302. Additionally or alternatively, the object store 216 may interoperate with the object cache manager 218 to search the cache 226 for the data object 302 using the unique name identifier for the data object 302. If there is a search hit, the file share feature 214-3 of the message platform 212-2 may retrieve and send the data object 302 to the related client 104-2 on behalf of the publishing client 102 via connection 402. The related client 104-1 may send the data object 302 for the publishing client 102 to the related client 104-2 using one or more transports 219 over connection 402 via a network connection (e.g., the network 230), a message connection (e.g., the message server 240), a direct connection, an indirect connection, a peer-to-peer connection, or any other transports consistent with the embodiments.

In various embodiments, the file share feature 214-3 of the message platform 212-2 may authenticate that the related client 104-2 has a defined relationship with the publishing client 102 prior to sharing a data object of the publishing client 102 with the related client 104-2. This may be accomplished in a number of different ways. In one embodiment, the file share feature 214-3 of the message platform 212-2 may query the server 110 to authenticate that the related client 104-2 has a dyadic relationship with the publishing client 102. In one embodiment, the file share feature 214-3 of the message platform 212-2 may receive security information to authenticate that the related client 104-2 has a dyadic relationship with the publishing client 102. The security information may comprise cryptographic information, such as a security certificate or authorization token from the publishing client 102 and/or the web service 252. The embodiments are not limited in this context.

In various embodiments, the file share feature 214-3 of the message platform 212-2 may authenticate that the related client 104-2 has a defined relationship with the related client 104-1 prior to sharing a data object of the publishing client 102 with the related client 104-2. This may be accomplished in a number of different ways. In one embodiment, the file share feature 214-3 of the message platform 212-2 may query the server 110 to authenticate that the related client 104-2 has a dyadic relationship with the related client 104-1. In one embodiment, the file share feature 214-3 of the message platform 212-2 may receive security information to authenticate that the related client 104-2 has a dyadic relationship with the related client 104-1. The security information may comprise cryptographic information, such as a security certificate or authorization token from the web service 252. In one embodiment, the file share feature 214-3 of the message platform 212-2 may check local resources and information stored by the message platform 212-2 indicating that the related client 104-2 is a friend of the related client 104-1. The embodiments are not limited in this context.

The file share feature 214-3 of the message platform 212-3 implemented by the related client 104-2 may receive the data object 302 from the related client 104-1 over connection 402. The object store 216 or the object cache manager 218 of the message platform 212-3 may store the data object 302 in its own storage media. The file share feature 214-3 of the message platform 212-3 may send a notification that the data object 302 is stored by the related client 104-2 to the web service 252 for addition to the distribution list 254. This may also be accomplished using the presence feature 214-4 of the message platform 212-3.

In various embodiments, the file share feature 214-3 of the message platform 212-3 may receive the distribution list 254. The file share feature 214-3 may receive the distribution list 254 from various entities of systems 100, 200, including the publishing client 102, the web service 252, the first related client 104-1, and so forth. The distribution list 254 may comprise a list of related clients 104-1-a actually storing the data object 302 on behalf of the publishing client 102, or potentially storing the data object 302 on behalf of the publishing client 102. For instance, the distribution list 254 may indicate that the related client 104-1 stores the data object 302.

In various embodiments, the file share feature 214-3 of the message platform 212-3 may generate the distribution list 254. The distribution list 254 may also be generated by any of the devices shown in the operating environment 300, including the publishing client 102 and the related clients 104-1, 104-2. This may be desirable when the web service 252 is offline, or to reduce communication overhead associated with maintaining and communicating the distribution list 254, for example. In one embodiment, the file share feature 214-3 may generate the distribution list 254 from information received from various entities in the operating environment 300, such as the web service 252. For example, the file share feature 214-3 may generate the distribution list 254 using a list of mutual friends of the publishing client 102 and the related client 104-2, which would result in 104-1 (and 104-3 as shown in FIG. 1). In another example, the file share feature 214-3 may generate the distribution list 254 using a list of second degree relationships of the related client 104-2, which would result in 104-4 (as shown in FIG. 1). In one embodiment, the file share feature 214-3 may generate the distribution list 254 from information received with the unique object name for the data object 302. For instance, the notification technique used to notify, publish or otherwise distribute the unique object name may also provide a list of other clients receiving similar notification. If the publication technique is an email message, for example, the list of other clients receiving similar notification may comprise a list of email addresses on a "cc:" line of the email message. The file share feature 214-3 of the message platform 212-3 may collect such information and generate a list of candidate clients for the distribution list 254. The file share feature 214-3 may also call (and can cache) a web service to generate the distribution list 254, such as by querying information from the web service 252.

In some cases, the file share feature 214-3 may apply one or more filters to narrow the list of candidate clients. The file share feature 214-3 may perform various post-processing filtering and sorting operations to prioritize related clients on the distribution list 254 before attempting to retrieve the data object 302. Examples of suitable filters, in no particular order, may include without limitation whether a friend is online or offline, whether a friend supports distributed caching techniques, type of connections available (e.g., direct or indirect), connection bandwidth, connection latency, previous success using a connection, batch object requests, previous hits for a particular data object, mutual friends of the publishing client 102 and the related client 104-2, filtering based on friends of just the publishing client 102, filtering based on online mutual friends or friends of the publishing client 102, and so forth. The file share feature 214-3 may apply one or more filters to the related clients on the distribution list 254 to prioritize or rank the related clients to facilitate selection and retrieval of the data object 302. The file share feature 214-3 may also improve filtering operations over time based on success rates in retrieving data objects.

The file share feature 214-3 of the message platform 212-3 may select the related client 104-1 from the distribution list 254 in accordance with one or more distribution rules. The file share feature 214-3 of the message platform 212-3 implemented by the related client 104-2 may have logic implementing one or more distribution rules as described in detail with reference to FIG. 1. In cases where the distribution list 254 indicates that multiple related clients 104-1-a currently store the data object 302, or potentially store the data object 302, the related client 104-2 may implement a selection algorithm based on any of the distribution rules (or filtering rules) as previously discussed to select from among the related clients 104-1-a on the distribution list 254. For instance, a distribution rule may indicate the related client 104-2 should attempt to select a mutual friend of the publishing client 102 and the related client 104-2. In another example, a distribution rule may indicate the related client 104-2 should attempt to randomly select a friend of the publishing client 102. In yet another example, a distribution rule may indicate the related client 104-2 should attempt to select a friend of the publishing client 102 in a same order as presented after one or more filtering or sorting operations are applied. Other distribution rules may be designed for a given implementation, and the embodiments are not limited in this context.

In cases where the distribution list 254 indicates that there are no related clients 104-1-a currently storing the data object 302, or if there are not related client 104-1-a currently storing the data object 302 that are online, or if after some number of fetch attempts or period of time (timeout), the file share feature 214-3 of the message platform 212-3 may attempt to retrieve the data object 302 from the web service 252 over connection 406 as a default distribution rule. This may be accomplished using the unique name identifier and location information (e.g., a URL pointing to the data object 302 stored by the web service 252). Additionally or alternatively, the distribution rules may be implemented by the web service 252 since it has more knowledge of resources for the systems 100, 200, and can make a more intelligent selection of a given related client 104-1-a on the distribution list 254. In this case, the web service 252 may send information for the selected related client 104-1-a rather than the entire distribution list 254.

In various embodiments, the file share feature 214-3 of the message platform 212-3 may select and contact a series of related clients (e.g., 104-1, 104-3, 104-4 . . . 104-a) from the distribution list 254 in a sequential manner until the data object 302 is successfully found and retrieved (or received). For instance, the file share feature 214-3 of the message platform 212-3 may select and contact the related client 104-1 from the distribution list 254 in accordance with one or more distribution rules, and if there is a miss, select and contact another related client (e.g., 104-3, 104-4 . . . 104-a) until the data object 302 is successfully located and retrieved by the related client 104-2.

In various embodiments, the file share feature 214-3 of the message platform 212-3 may select and contact multiple related clients (e.g., 104-1, 104-3, 104-4 . . . 104-a) from the distribution list 254 in a parallel manner until the data object 302 is successfully found and retrieved. In one embodiment, the file share feature 214-3 of the message platform 212-3 may select and contact multiple related clients (e.g., 104-1, 104-3, 104-4 . . . 104-a) from the distribution list 254 in accordance with one or more distribution rules, and if there is a hit, cancel any unfulfilled requests.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 5 illustrates one embodiment of a logic flow 500. The logic flow 500 may be representative of some or all of the operations executed by one or more embodiments described herein. In one embodiment, the logic flow 500 may be representative of some or all of the operations executed by a related client 104-1-a, such as the related client 104-1 sending shared binary content, for example.

In the illustrated embodiment shown in FIG. 5, the logic flow 500 receives a data object for a publishing client by a first related client having a defined relationship with the publishing client at block 502. For example, the related client 104-1 may receive the data object 302 for the publishing client 102 from the publishing client 102 or the web service 252 of the server 110 over respective connections 310, 314 via a network connection (e.g., the network 230), a message connection (e.g., the message server 240), a peer-to-peer connection, a combination of all three, or any other transports consistent with the embodiments. The related client 104-1 may have a defined relationship with the publishing client 102. The related client 104-1 and the publishing client 102 may be friends, for example, in a SNS implemented by the web service 252 of the server 110.

The logic flow 500 may store the data object of the publishing client by the first related client at block 504. For example, the related client 104-1 may store the data object 302 of the publishing client 102 in the file system 224 or the cache 226 under direction of the object store 216 or object cache manager 218.

The logic flow 500 may receive a request for the data object from a second related client having a defined relationship with the publishing client at block 506. For example, the related client 104-1 may receive a request for the data object from the related client 104-2 having a defined relationship with the publishing client 102. Similar to the related client 104-1 and the publishing client 102, the related client 104-2 and the publishing client 102 may also be friends, for example, in a SNS implemented by the web service 252 of the server 110. The related clients 104-1, 104-2 may optionally be friends as desired for a given tradeoff between security and availability.

The logic flow 500 may send the data object from the first related client to the second related client at block 508. For example, the related client 104-1 may send the data object to the related client 104-2 over connection 402. This may be in response to a request received from the related client 104-2. The related client 104-1 may send the data object 302 for the publishing client 102 to the related client 104-2 over connection 402 via a network connection (e.g., the network 230), a message connection (e.g., the message server 240), a peer-to-peer connection, a combination of all three, or any other transports consistent with the embodiments.

Figure 6:
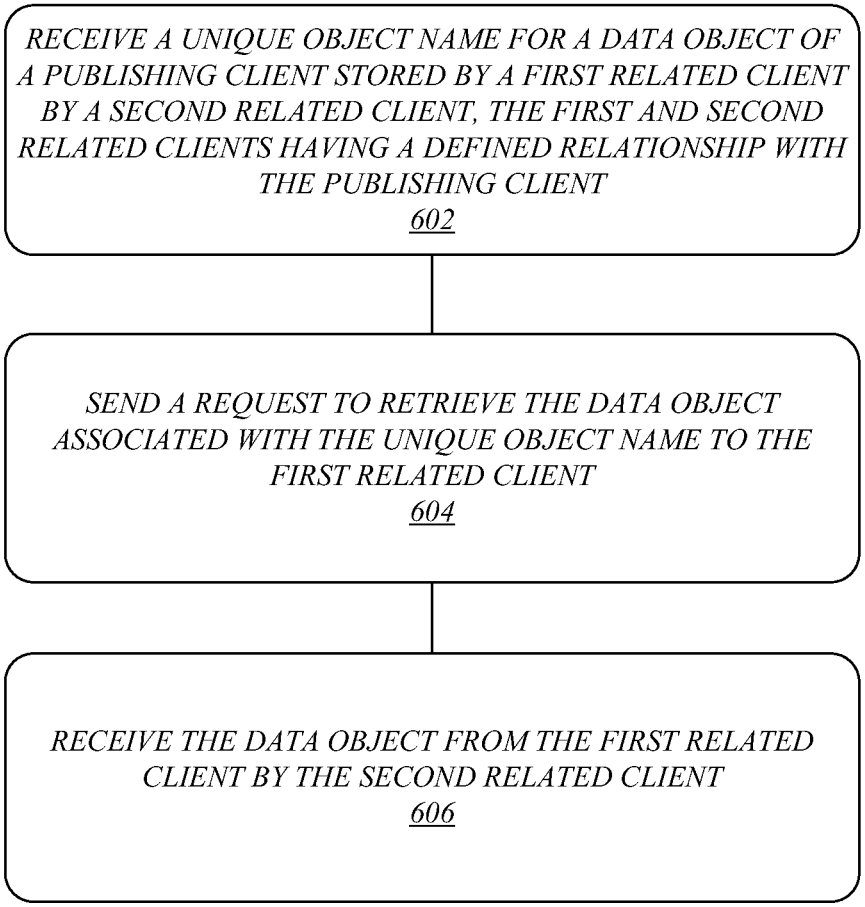
FIG. 6 illustrates an embodiment of a second logic flow for a second relation.

FIG. 6 illustrates one embodiment of a logic flow 600. The logic flow 600 may be representative of some or all of the operations executed by one or more embodiments described herein. In one embodiment, the logic flow 600 may be representative of some or all of the operations executed by a related client 104-1-a, such as the related client 104-2 receiving shared binary content, for example.

In the illustrated embodiment shown in FIG. 6, the logic flow 600 may receive a unique object name for a data object of a publishing client stored by a first related client by a second related client, the first and second related clients having a defined relationship with the publishing client at block 602. For example, the related client 104-2 may receive a unique object name for the data object 302 of the publishing client 102 stored by the related client 104-1. The related clients 104-1, 104-2 may each have a defined relationship with the publishing client 102. For example, the related clients 104-1, 104-2 may each be friends with the publishing client 102 in a SNS implemented by the web service 252 of the server 110. The related clients 104-1, 104-2 may optionally be friends as desired for a given tradeoff between security and availability.

The logic flow 600 may send a request to retrieve the data object associated with the unique object name to the first related client at block 604. For example, the related client 104-2 may send a request to retrieve the data object 302 associated with the unique object name to the related client 104-1. The related client 104-1 may receive the request, retrieve the data object 302 from the file system 224 or the cache 226 using the unique object name, and send the data object 302 to the related client 104-2 over connection 402. The related client 104-1 may optionally authenticate that the related client 104-2 has a defined relationship with the publishing client 102, and possibly the related client 104-1, prior to sending the data object 302 to the related client 104-2. The authentication operations may be accomplished using local or remote resources.

The logic flow 600 may receive the data object from the first related client by the second related client at block 606. For example, the related client 104-2 may receive the data object 302 from the related client 104-1 over connection 402. The related client 104-2 may receive the data object 302 for the publishing client 102 from the related client 104-1 over connection 402 via a network connection (e.g., the network 230), a message connection (e.g., the message server 240), a peer-to-peer connection, a combination of all three, or any other transports consistent with the embodiments.

As previously described, in some embodiments the related client 104-2 may also receive or generate the distribution list 254 indicating that the data object 302 is stored by the first related client 104-1. In one embodiment, the related client 104-2 may select the related client 104-1 from among others listed in the distribution list 254 in accordance with presence information and one or more distribution rules.

Figure 7:
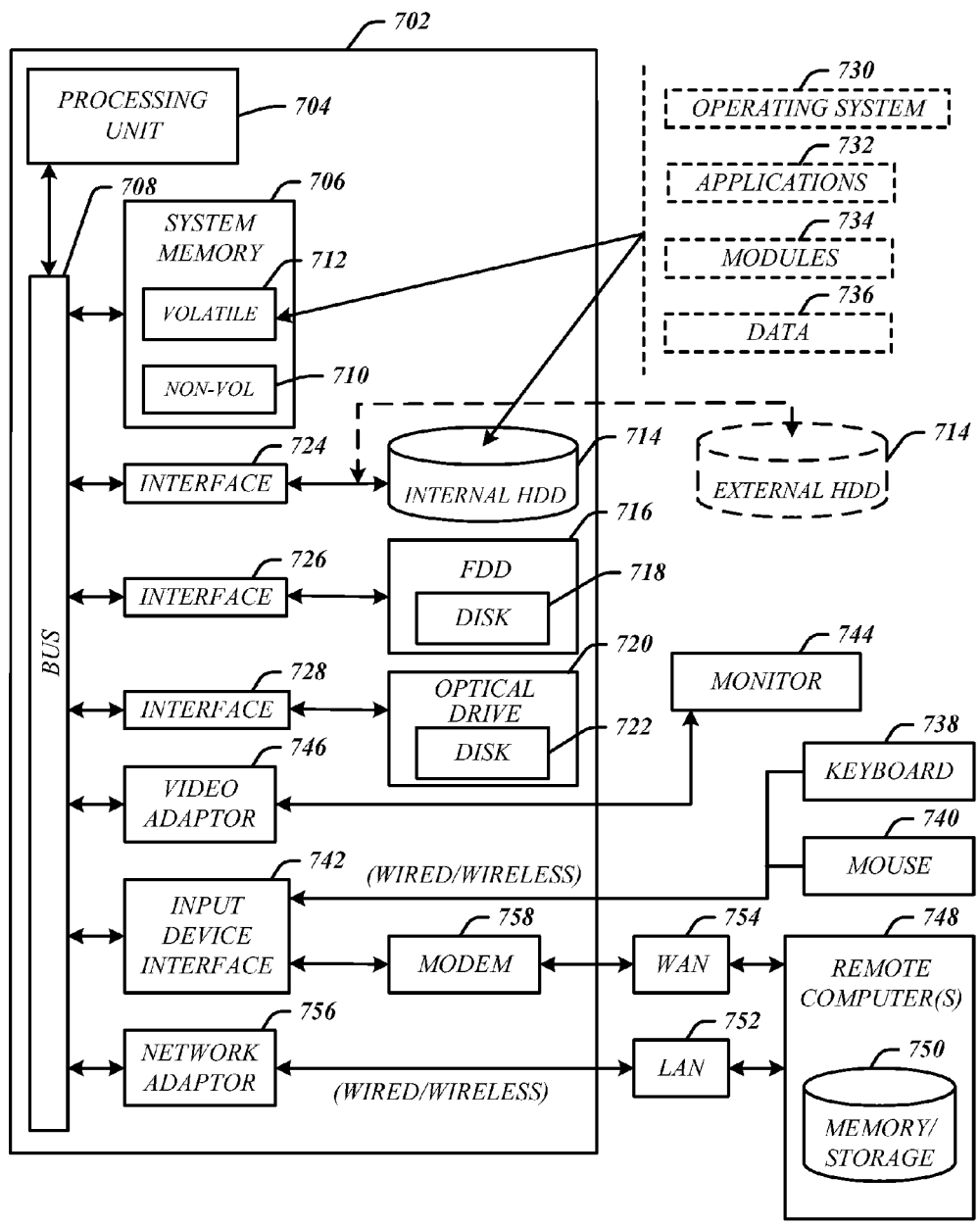
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include various elements implemented by the systems 100, 200, such as the message platforms 212-1-d, the web service 252, and so forth.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
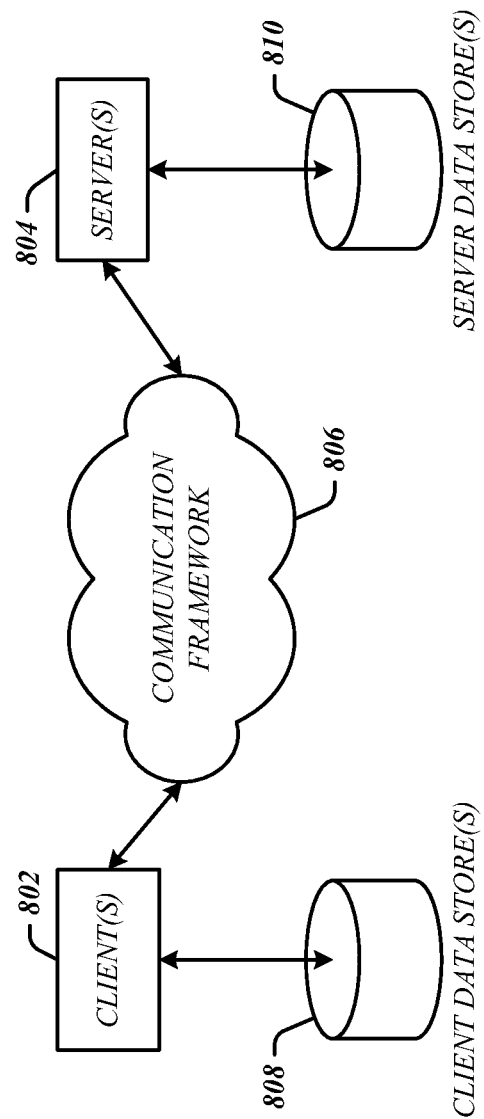
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the publishing client 102 and/or the related clients 104-1-a. The servers 804 may implement the server 110 and/or the message server 240. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
authenticating that a first related client has a dyadic relationship with a publishing client, wherein the first related client is a separate device from the publishing client;
receiving a data object from the publishing client at the first related client based on the authentication of the dyadic relationship with the publishing client, wherein the data object is also stored to an online storage of a web service by the publishing client;
storing the data object of the publishing client at the first related client;
receiving a request at the first related client for the data object from a second related client having a dyadic relationship with the publishing client, wherein the second related client is a separate device from the publishing client and from the first related client; and
sending the data object from the first related client to the second related client.

2. The computer-implemented method of claim 1, comprising storing the data object at the first related client using a unique object name received with the data object.

3. The computer-implemented method of claim 1, comprising receiving the data object for the publishing client by the first related client over a direct or indirect connection between the publishing client and the first related client.

4. The computer-implemented method of claim 1, comprising receiving the data object for the publishing client by the first related client from a network storage server.

5. The computer-implemented method of claim 1, wherein authenticating that the first related client has a dyadic relationship with the publishing client comprises authenticating that the first related client has a social-networking relationship with the publishing client in a social-networking system.

6. The computer-implemented method of claim 1, comprising authenticating that the second related client has a dyadic relationship with the publishing client.

7. The computer-implemented method of claim 1, comprising querying a server to authenticate that the second related client has a dyadic relationship with the publishing client.

8. The computer-implemented method of claim 1, comprising receiving security information by the first related client to authenticate that the second related client has a dyadic relationship with the publishing client.

9. The computer-implemented method of claim 1, comprising authenticating that the first related client has a defined relationship with the second related client.

10. The computer-implemented method of claim 1, comprising sending the data object from the first related client to the second related client over a direct or indirect connection.

11. An article comprising a storage device containing instructions that when executed enable a system to:
authenticate that a second related client has a dyadic relationship with a publishing client, wherein the second related client is a separate device from the publishing client;
receive a unique object name for a data object of the publishing client, the data object stored at a first related client, at the second related client based on the authentication of the dyadic relationship with the publishing client, the first related client having a dyadic relationship with the publishing client, wherein the data object is also stored to an online storage of a web service by the publishing client, wherein the first related client is a separate device from the publishing client and from the second related client;
send a request from the second related client to retrieve the data object associated with the unique object name to the first related client; and
receive the data object from the first related client at the second related client.

12. The article of claim 11, further comprising instructions that when executed enable the system to send security information to the first related client to authenticate that the second related client has a defined relationship with the publishing client.

13. The article of claim 11, further comprising instructions that when executed enable the system to receive a distribution list indicating that the data object is stored by one or more related clients including the first related client.

14. The article of claim 11, further comprising instructions that when executed enable the system to generate a distribution list indicating that the data object may be stored by one or more related clients including the first related client.

15. The article of claim 11, further comprising instructions that when executed enable the system to select the first related client from a distribution list using one or more distribution rules.

16. An apparatus, comprising:
a first related client having a message platform with a file share feature and an object store, the file share feature operative to authenticate that the first related client has a dyadic relationship with a publishing client, retrieve a data object for the publishing client based on the authentication of the dyadic relationship with the publishing client, wherein the first related client is a separate device from the publishing client, wherein the data object is also stored to an online storage of a web service by the publishing client, the publishing client having a dyadic relationship with a second related client, wherein the second related client is a separate device from the publishing client and from the first related client, the first related client to send the data object to the second related client on behalf of the publishing client, and the object store operative to store and manage the data object using a unique name identifier received with the data object.

17. The apparatus of claim 16, the file share feature operative to authenticate that the second related client has a defined relationship with the publishing client.

18. The apparatus of claim 16, the file share feature operative to authenticate that the second related client has a defined relationship with the first related client.

19. The apparatus of claim 16, comprising a file system operative to store the data object using the unique name identifier.

20. The apparatus of claim 16, comprising a cache operative to store the data object using the unique name identifier.

* * * * *